United States Patent [19]
Aoki et al.

[11] Patent Number: 5,694,314
[45] Date of Patent: Dec. 2, 1997

[54] OPTICAL DISK DRIVE UNIT

[75] Inventors: Jun Aoki; Hidenori Saitoh, both of Kawasaki, Japan

[73] Assignee: Fujitsu, Ltd., Kawasaki, Japan

[21] Appl. No.: 573,751

[22] Filed: Dec. 18, 1995

Related U.S. Application Data

[63] Continuation of Ser. No. 334,079, Nov. 4, 1994, abandoned.

[30] Foreign Application Priority Data

Jan. 20, 1994 [JP] Japan .................. 6-004690

[51] Int. Cl.⁶ .................. G11B 33/12; G11B 7/00
[52] U.S. Cl. .................. 369/77.2; 369/75.1
[58] Field of Search .................. 360/114, 97.01; 369/75.1, 77.1, 77.2, 219, 247, 44.15, 44.16, 44.17; 439/67 R, 77

[56] References Cited

U.S. PATENT DOCUMENTS

| | | | |
|---|---|---|---|
| 4,408,255 | 10/1983 | Adkins | 361/382 |
| 5,040,997 | 8/1991 | Garner | 439/77 |
| 5,134,252 | 7/1992 | Himeno et al. | 174/268 |
| 5,214,630 | 5/1993 | Goto et al. | 369/44.14 |
| 5,218,585 | 6/1993 | Childers et al. | 369/44.14 |
| 5,241,438 | 8/1993 | Matsushima | 360/105 |
| 5,243,495 | 9/1993 | Read et al. | 361/685 |
| 5,276,572 | 1/1994 | Kinoshita et al. | 360/97.01 |
| 5,329,412 | 7/1994 | Stefansky | 360/97.01 |
| 5,337,202 | 8/1994 | Jabbarai et al. | 360/97.01 |

FOREIGN PATENT DOCUMENTS

| | | | |
|---|---|---|---|
| 553551 | 8/1993 | European Pat. Off. | |
| 5-217357 | 8/1983 | Japan | |
| 60-94369 | 5/1985 | Japan | |
| 62-242904 | 10/1987 | Japan | |
| 64-72339 | 3/1989 | Japan | |
| 2-173945 | 7/1990 | Japan | |
| 2257431 | 10/1990 | Japan | 360/114 |
| 3-213362 | 9/1991 | Japan | |
| 3225627 | 10/1991 | Japan | 360/114 |
| 4-82026 | 3/1992 | Japan | |

*Primary Examiner*—Stuart S. Levy
*Assistant Examiner*—William J. Klimowicz
*Attorney, Agent, or Firm*—Staas & Halsey

[57] ABSTRACT

A compact optical disk drive unit improved in workability of assembly. A first printed wiring board having a signal demodulating circuit, a drive unit control circuit, and a drive circuit for driving a voice coil motor is mounted on an upper surface of a drive base. A first connector is mounted on a lower surface of the first printed wiring board. A moving optical assembly having an objective lens is movably mounted on the drive base, and a fixed optical assembly having a laser drive module and a photodetector is mounted on a lower surface of the drive base. The fixed optical assembly includes a second printed wiring board having a second connector. The first and second printed wiring boards and are connected together through the first and second connectors.

8 Claims, 6 Drawing Sheets

OPTICAL DISK DRIVE UNIT

This application is a continuation, of application Ser. No. 08/334,079, filed Nov. 4, 1994, now abandoned.

BACKGROUND OF THE INVENTION

1. Field of the Invention

The present invention relates generally to an optical disk drive unit, and more particularly to a connection structure between a unit printed wiring board and an optical head printed wiring board of an optical disk drive unit.

2. Description of the Related Art

An optical disk is now highlighted as a memory medium constituting a nucleus in the trend of multimedia development during recent years. The optical disk is usually accommodated in a cartridge for use. The optical disk cartridge is loaded into an optical disk drive unit, and data is written to or read from the optical disk by an optical head.

For realization of a reduction in size, a recent optical disk drive unit is constructed of a fixed optical assembly including a laser diode module, a beam splitter for reflecting and transmitting a laser beam, a photodetector for detecting a reflected light from the optical disk, and of a moving optical assembly including a beam rising mirror and an objective lens. The moving optical assembly is moved in a radial direction of the optical disk along a pair of rails by a voice coil motor. A laser beam having write power output from the laser diode module mounted on the fixed optical assembly is transmitted through the beam splitter, reflected by the beam rising mirror of the moving optical assembly, and condensed by the objective lens to strike on the optical disk, thus writing data on the optical disk.

On the other hand, the reading of data is performed by directing a laser beam having read power onto the optical disk. A reflected light from the optical disk is formed into a collimated beam by the objective lens, and is then reflected by the beam splitter. The light reflected by the beam splitter is detected by the photodetector and is converted into an electrical signal by the photodetector.

The fixed optical assembly includes a head base and a head printed wiring board mounted on the head base. The head printed wiring board has a preamplifier for amplifying the electrical signal obtained by photo-electric conversion from the photodetector and a laser drive circuit for driving the laser diode module. In the conventional optical disk drive unit, the head printed wiring board is connected through a flexible printed wiring board to a unit printed wiring board including a signal demodulating circuit, a drive unit control circuit, and a voice coil motor drive circuit.

The use of the flexible printed wiring board for connecting the head printed wiring board to the unit printed wiring board requires a space for locating the flexible printed wiring board. This is one of causes to hindering a reduction in size of the optical disk drive unit. Further, in constructing the optical disk drive unit, much time is required for the connection between the head printed wiring board and the unit printed wiring board, thus reducing the ease of assembly.

Moreover, the use of the flexible printed wiring board for connecting the head printed wiring board to the unit printed wiring board causes a problem that when a reproduction signal has a high frequency as in a recent optical disk drive unit, the reproduction signal is liable to pick up noise at a part of the flexible printed wiring board. In other words, because the flexible printed wiring board functions as an antenna, noise is likely to occur due to electromagnetic interferences.

SUMMARY OF THE INVENTION

It is therefore an object of the present invention to provide a compact optical disk drive unit which improve ease of assembly.

It is another object of the present invention to provide an optical disk drive unit which is less affected by noise even when the frequency of a reproduction signal is high.

In accordance with an aspect of the present invention, there is provided an optical disk drive unit comprising a drive base having an opening; a spindle motor mounted on the drive base; a moving optical assembly movably mounted on the drive base, the moving optical assembly having a beam rising mirror, an objective lens, a lens actuator for performing focusing of the objective lens; actuator means mounted on the drive base for moving the moving optical assembly; a first printed wiring board mounted on an upper surface of the drive base, the first printed wiring board having a signal demodulating circuit, a drive unit control circuit, and a drive circuit for driving the actuator means; a first connector mounted on a lower surface of the first printed wiring board; a fixed optical assembly mounted on a lower surface of the drive base, the fixed optical assembly including a head base, laser beam generating means mounted on the head base, a photodetector mounted on the head base, and a second printed wiring board mounted on the head base, the second printed wiring board having a laser drive circuit for driving the laser beam generating means and a preamplifier for amplifying an electrical signal obtained by photo-electric conversion from the photodetector; and a second connector mounted on an upper surface of the second printed wiring board and connected to the first connector through the opening of the drive base.

Preferably, an elastic support member is interposed between the second printed wiring board and the head base, thereby absorbing a tolerance of space between the first printed wiring board and the second printed wiring board to effect reliable connection between the first connector and the second connector.

According to the present invention, the connection between the first printed wiring board and the second printed wiring board is attained by the first and second connectors. Accordingly, the space for locating the flexible printed wiring board as in the prior art is not necessary, thereby realizing a reduction in size of the second printed wiring board and the optical disk drive unit.

Further, the first printed wiring board and the second printed wiring board are connected together by plug-in connection of the first and second connectors. Accordingly, the workability of assembly can be greatly improved. Besides, the second printed wiring board is sandwiched between the drive base and the head base and is connected with the first printed wiring board through the connectors. Therefore, the second printed wiring board is electromagnetically shielded and is less subjected to electromagnetic interference.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

A preferred embodiment of the present invention will now be described with reference to the drawings.

Figure 1:
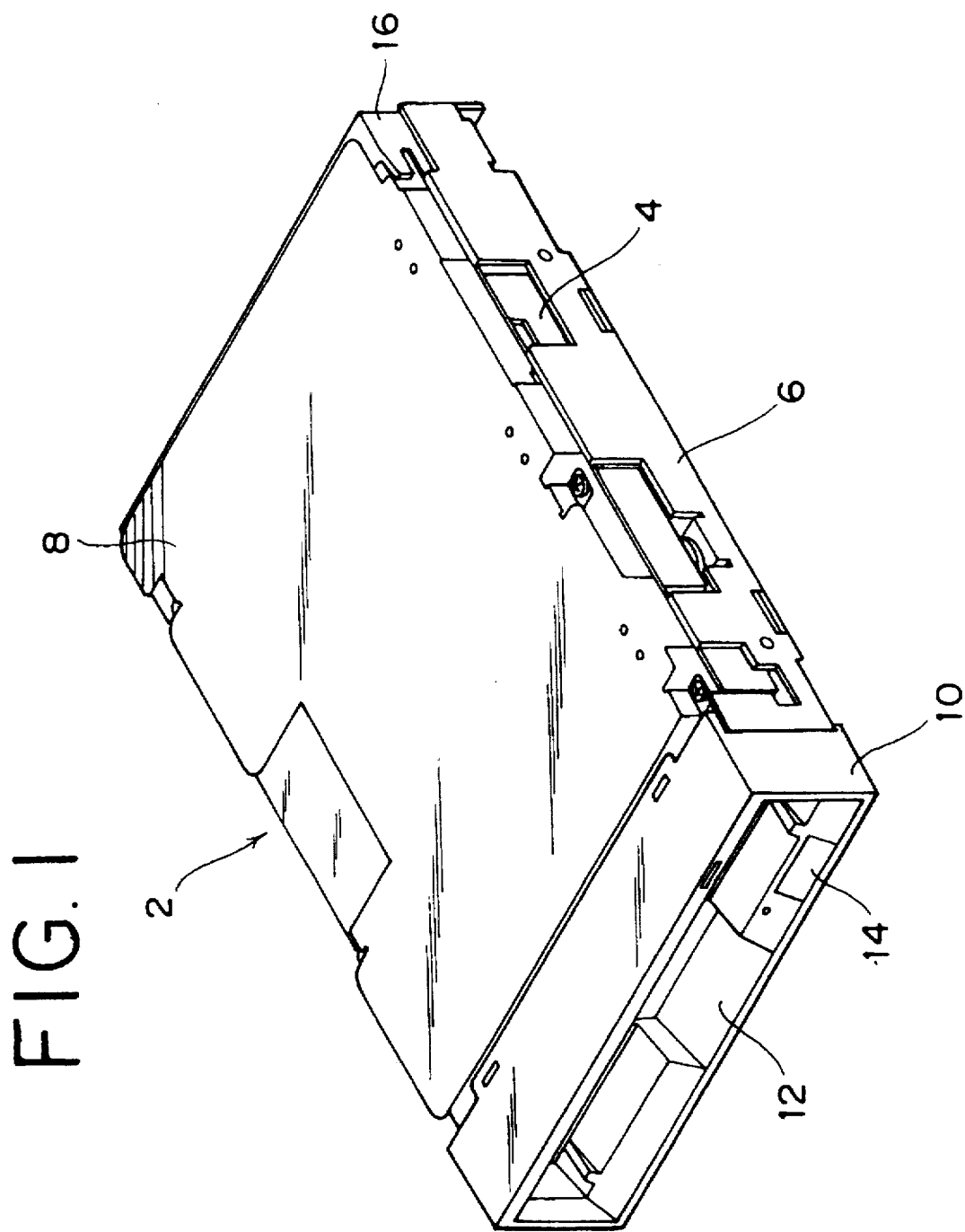
FIG. 1 is an overall perspective view of an optical disk drive unit according to a preferred embodiment of the present invention as viewed from the upper side.
Figure 2:
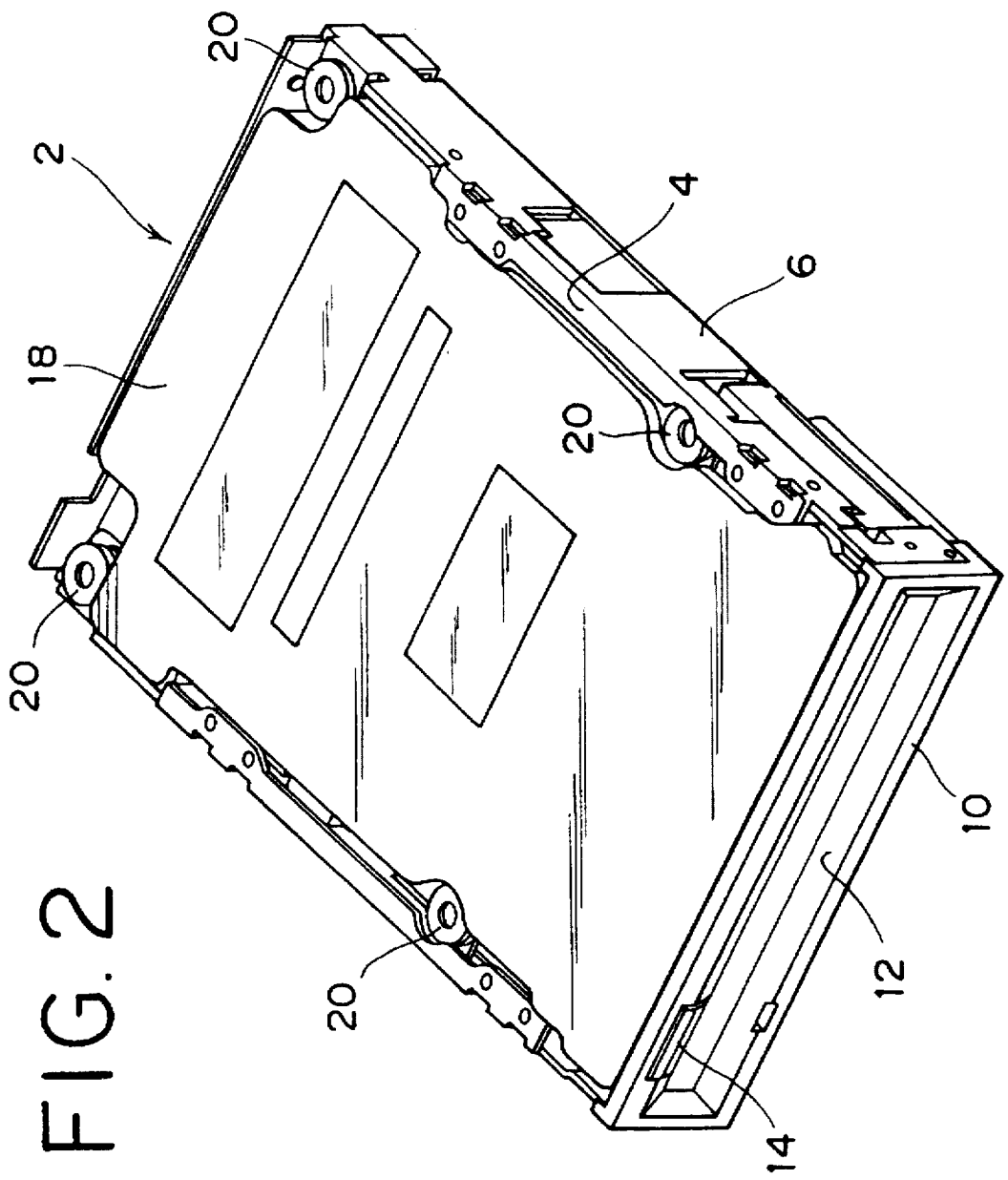
FIG. 2 is an overall perspective view of the optical disk drive unit as viewed from the lower side.

Referring to FIGS. 1 and 2, there are shown overall perspective views of an optical disk drive unit according to a preferred embodiment of the present invention as viewed from an upper side and a lower side of the drive unit, respectively. Reference numeral 4 denotes a drive base formed of an aluminum alloy. The drive base 4 is mounted through four rubber vibration isolators 20 to a frame 6. The drive base 4 has an opening 5 through which a connector 46 of a fixed optical assembly 26 to be hereinafter described is inserted.

A top cover 8 and a bottom cover 18 are fixed to the drive base 4 by screws. A front panel 10 having an opening 12 through which an optical disk cartridge is inserted into an optical disk drive unit 2 is mounted on a front end of the frame 6. A connector 16 for electrically connecting the optical disk drive unit 2 to a computer is mounted on a rear end of the drive unit 2. Reference numeral 14 denotes an eject button. When the eject button 14 is pressed, an eject motor is rotated to cancel the mounting of an optical disk 62 on a spindle motor 22, and the optical disk cartridge is ejected from the opening 12 of the drive unit 2 by a spring force of a shutter opening/closing arm 32 to be hereinafter described.

Figure 3:
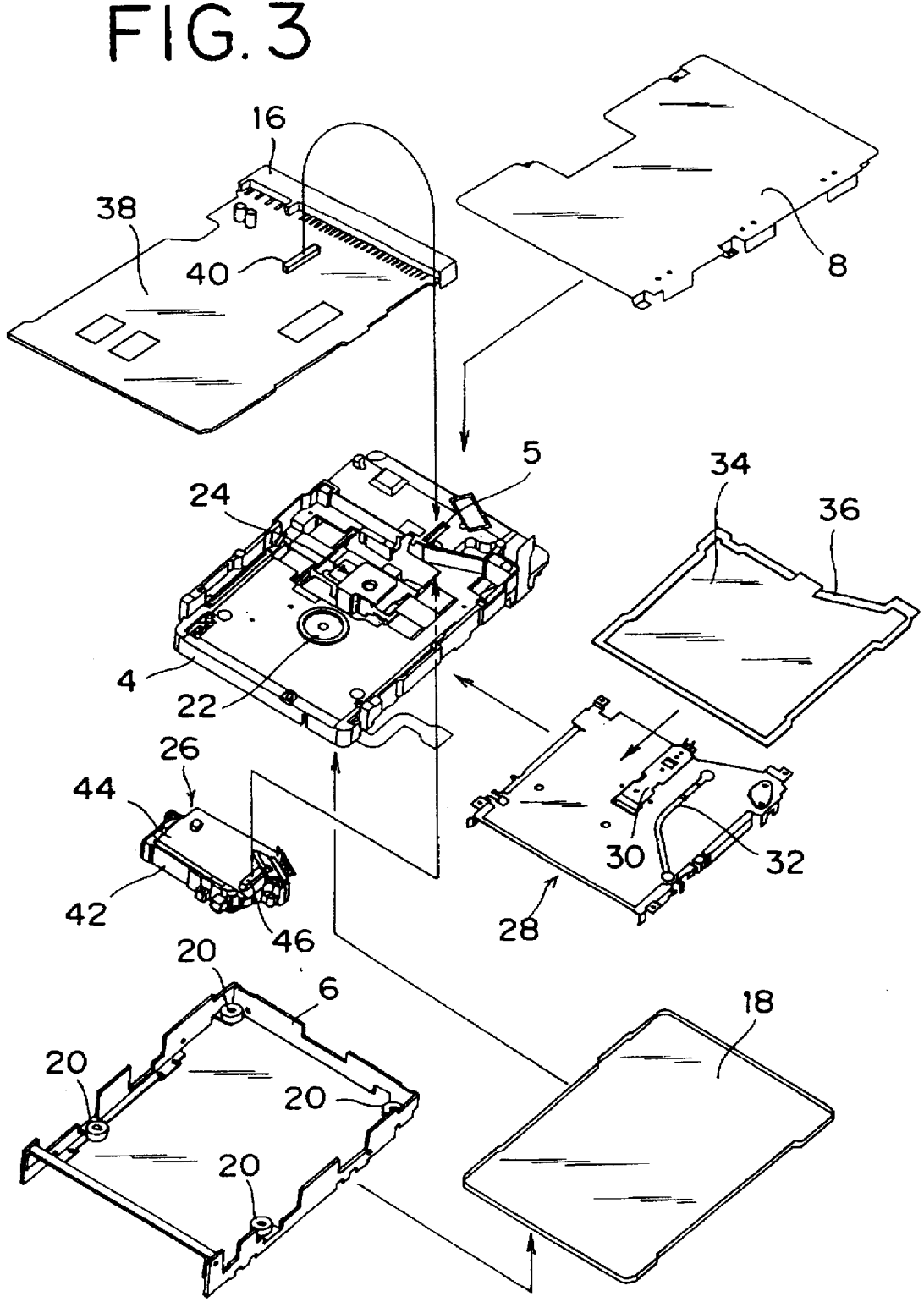
FIG. 3 is an exploded perspective view of the optical disk drive unit.

Referring to FIG. 3, there is shown an exploded perspective view of the optical disk drive unit 2 according to the preferred embodiment of the present invention. The spindle motor 22 for rotating the optical disk 62 is mounted on the drive base 4. When the optical disk cartridge is loaded into the optical disk drive unit 2, an output shaft of the spindle motor 22 and a hub portion of the optical disk 62 are connected together by a magnetic clamping structure with little slip between the output shaft and the hub portion. Accordingly, the optical disk 62 is rotated at the same speed as a rotating speed of the output shaft of the spindle motor 22.

Figure 4:
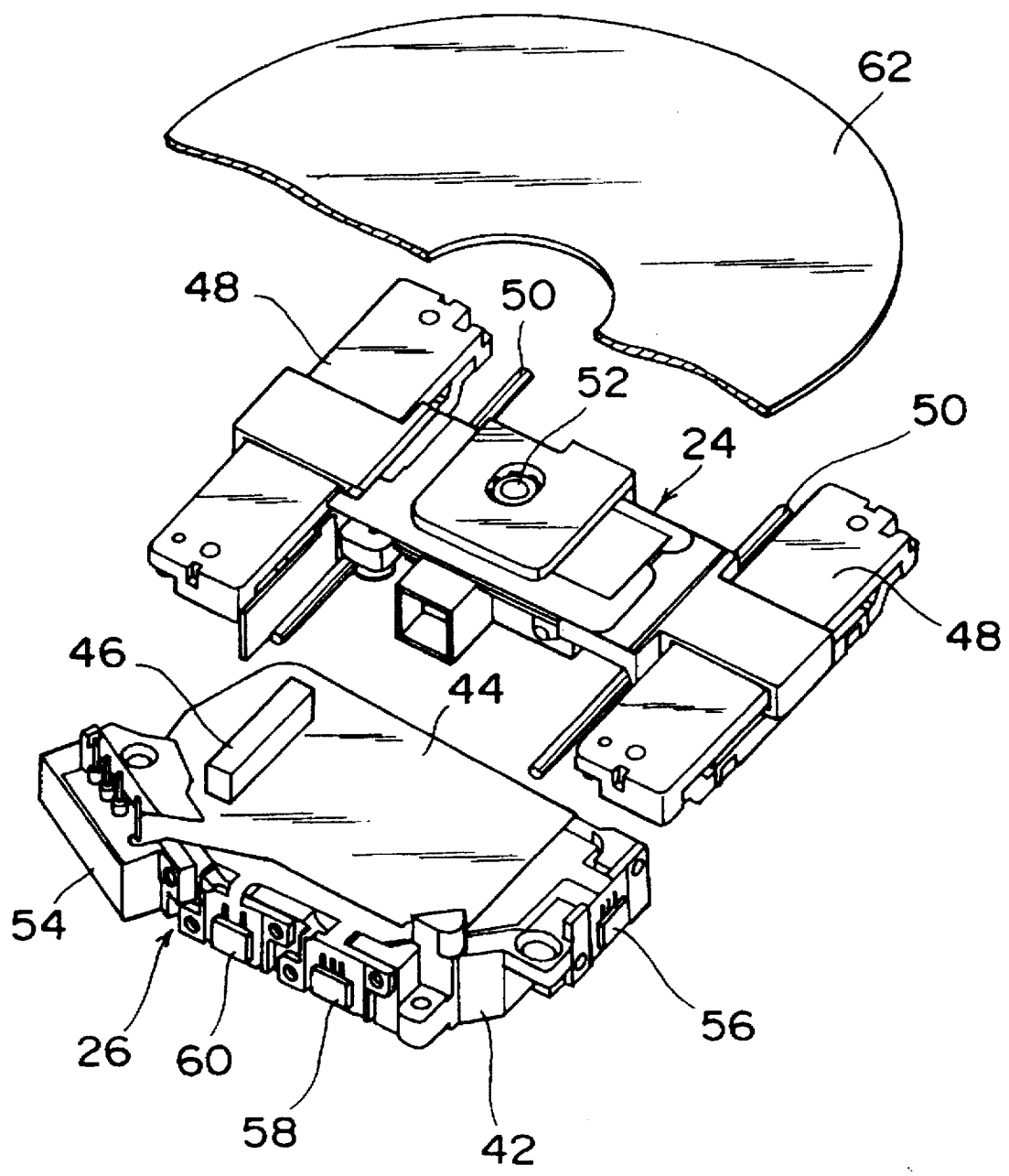
FIG. 4 is a perspective view showing a relation in arrangement between a fixed optical assembly and a moving optical assembly with a drive base omitted.

A moving optical assembly 24 is further mounted on the drive unit 4 so as to be movable in a radial direction of the optical disk 62 stored in the optical disk cartridge loaded into the drive unit 2. As shown in FIG. 4, a pair of magnetic circuits 48 fixed to the drive base 4 and coils provided in the moving optical assembly 24 constitute a voice coil motor. When the coils are supplied with an electric current, the moving optical assembly 24 is moved along a pair of guide rails 50. The direction of movement of the moving optical assembly 24 is controlled according to the direction of the electric current flowing in the coils. The moving optical assembly 24 includes a beam rising mirror, an objective lens 52, and a lens actuator for performing focusing and tracking of a laser beam.

Referring again to FIG. 3, the fixed optical assembly 26 is fixed to a lower surface of the drive base 4 in such a positional relationship that the connector 46 is inserted through the opening 5 of the drive base 4. The fixed optical assembly 26 is constructed of a head base 42 and a lower printed wiring board 44 mounted on the head base 42. Referring to FIG. 4, a laser diode module 54, a photodetector 56 for detecting a magneto-optical signal, a photodetector 58 for detecting a focusing error signal, and a photodetector 60 for detecting a tracking error signal are mounted on the head base 42 of the fixed optical assembly 26. FIG. 4 is a perspective view showing a relation in arrangement between the fixed optical assembly 26 and the moving optical assembly 24.

Figure 5:
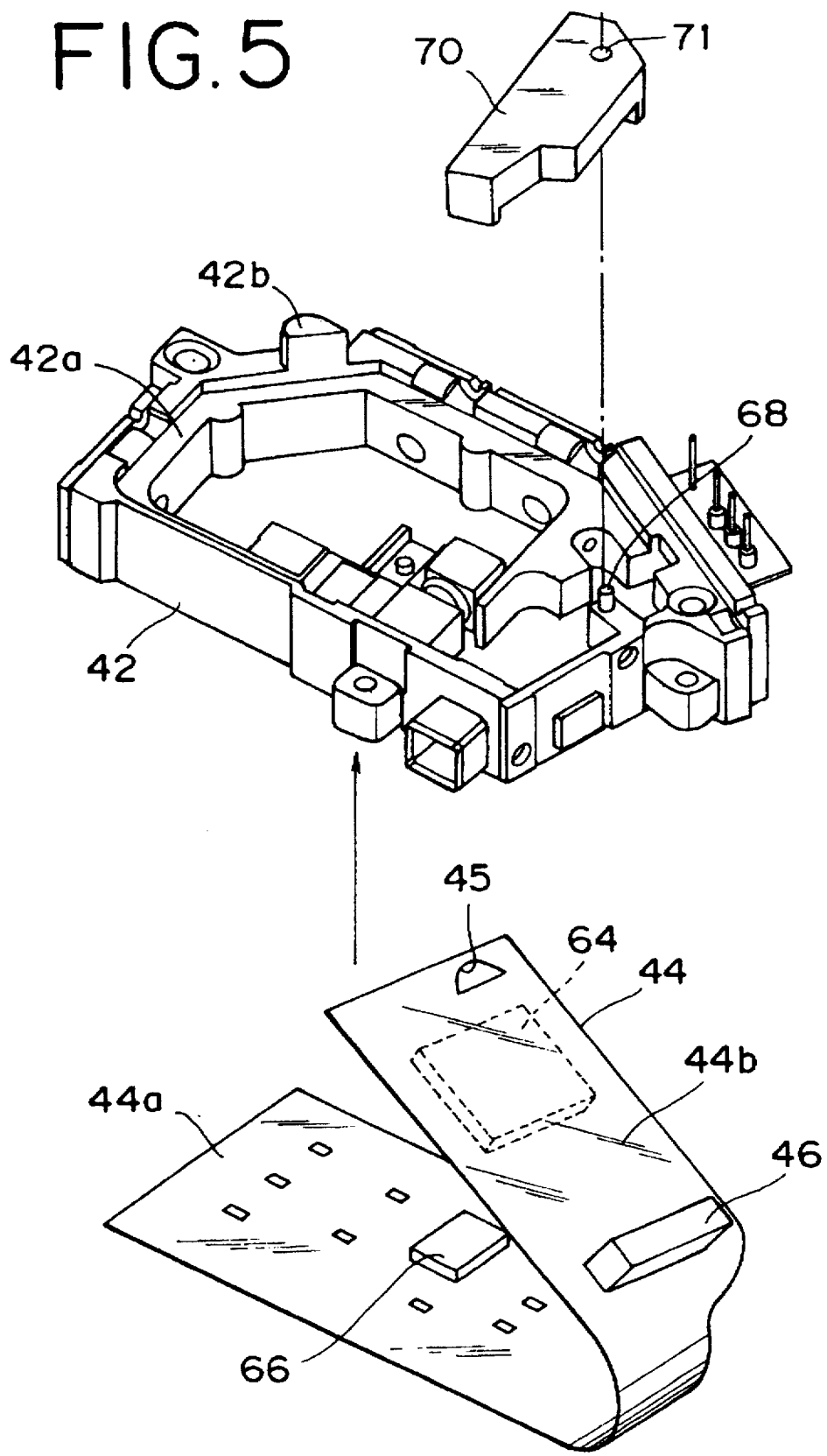
FIG. 5 is an exploded perspective view of the fixed optical assembly.

FIG. 5 shows an exploded perspective view of the fixed optical assembly 26. The head base 42 formed of an aluminum alloy is formed with a first mounting surface 42a and a second mounting surface 42b higher than the first mounting surface 42a by a given amount. The head base 42 has a projection 68. An elastic member 70 such as a rubber sponge having a hole 71 is mounted on the head base 42 in such a manner that the projection 68 is inserted in the hole 71 of the elastic member 70.

Electronic parts such as LSIs 64 and 66 are mounted on the lower printed wiring board 44 to constitute a laser drive circuit for driving the laser diode module 54 and a preamplifier circuit for amplifying an electrical signal obtained by photo-electric conversion from the photodetector 56, etc. A first portion 44a of the printed wiring board 44 is fixed to the first mounting surface 42a of the head base 42, and the elastic member 70 is mounted on the first portion 44a of the printed wiring board 44 with the projection 68 being inserted into the hole 71. Then, the printed wiring board 44 is folded in such a manner that the connector 46 is located over the elastic member 70, and a hole 45 of a second portion 44b of the printed wiring board 44 is engaged with the projection 42b of the head base 42, thus fixing the printed wiring board 44.

Referring again to FIG. 3, reference numeral 28 denotes an optical disk cartridge loading assembly. The optical disk cartridge loading assembly 28 has a bias magnet assembly 30 and an arm 32 for opening and closing a shutter of the optical disk cartridge. The bias magnet assembly 30 includes a permanent magnet and a bias coil. The assembly 30 has a known structure in that the permanent magnet is laterally slid to abut against a stopper according to the direction of an electric current flowing in the bias coil. For example, the permanent magnet is slid to the left when erasing data, whereas the permanent magnet is slid to the right when writing data, thereby applying a bias magnetic field to an optical disk surface.

The cartridge loading assembly 28 is fixed to the upper surface of the drive base 4 by screws, and an insulating sheet 34 is mounted on the assembly 28. A sealing member 36 such as a rubber sponge is mounted on the insulating sheet 34 at an outer peripheral portion thereof, so as to improve the sealability and prevent dust from sticking to the optical disk.

Reference numeral 38 denotes an upper printed wiring board. The connector 16 is mounted on the upper printed wiring board 38 at a rear end thereof. In FIG. 3, a lower surface of the upper printed wiring board 38 is shown. A connector 40 designed to engage with the connector 46 of the lower printed wiring board 44 is mounted on the lower surface of the upper printed wiring board 38. The upper printed wiring board 38 includes a signal demodulating circuit, a drive unit control circuit, and a drive circuit for driving the voice coil motor.

The upper printed wiring board 38 is mounted on the head base 4 through the insulating sheet 34, and the female connector 40 is engaged with the male connector 46 of the fixed optical assembly 26. Finally, the printed wiring board 38 is fixed by screws to the drive base 4.

Since the connector 46 of the fixed optical assembly 26 is supported by the elastic member 70, the nonuniformity of a space between the upper printed wiring board 38 and the lower printed wiring board 44 can be absorbed to thereby effect reliable connection between the connector 40 of the upper printed wiring board 38 and the connector 46 of the fixed optical assembly 26. After mounting the upper printed wiring board 38 on the drive base 4, the top cover 8 is fixed to the drive base 4 by screws, and the bottom cover 18 is fixed by screws to the lower surface of the drive base 4. Finally, the frame 6 is mounted through the rubber vibration isolators 20 to the side surface of the drive base 4, thus completing the optical disk unit 2.

Figure 6:
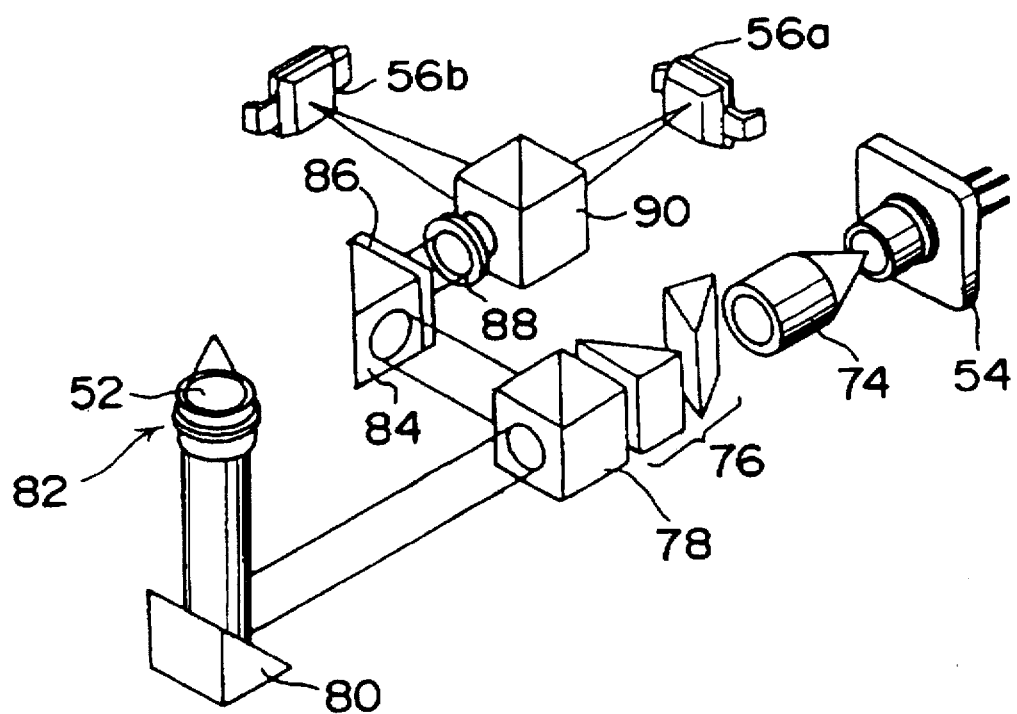
FIG. 6 is a perspective view showing a basic optical head arrangement applicable to the invention.

Referring to FIG. 6, a basic arrangement of an optical head which can be employed in the present invention is shown. A laser beam emitted from the laser diode module 54 is collimated by a collimator lens 74 and transmits through beam compensation prisms 76 and a beam splitter 78. The beam is then reflected by a beam rising mirror 80 and is focused on an optical disk by the objective lens 52 of a lens actuator 82. The lens actuator 82 includes focusing and tracking coils for moving the objective lens 52 to attain focusing and tracking of the beam.

A reflected light beam reflected by the optical disk is collimated by the objective lens 52 and is then reflected by the beam rising mirror 80, the beam splitter 78 and a mirror 84. A half-wave plate 86 is bonded to the mirror 84 for rotating a plane of polarization of an incident light beam by 45 degrees. The beam is then transmitted through a focusing lens 88 and enters a polarization beam splitter 90.

A P-wave component of the beam transmits through the polarization beam splitter 90 and is detected by a photodetector 56a for a P-wave component. An S-wave component of the beam is reflected by the polarization beam splitter 90 and is detected by a photodetector 56b As described above, according to the present invention, the lower printed wiring board and the upper printed wiring board are connected together by using the connectors. Accordingly, a compact optical disk drive unit can be provided with a greatly improved ease of assembly. Furthermore, even when a reproduction signal has a high frequency, the reproduction signal is hardly affected by noise.

What is claimed is:

1. An optical disk drive unit comprising:

a drive base having an opening and upper and lower surface sides;

a spindle motor mounted on said drive base;

a moving optical assembly movably mounted on the lower surface side of said drive base, said moving optical assembly having a beam rising mirror, an objective lens, and a lens actuator for performing focusing of a laser beam by moving said objective lens;

actuator means mounted on the lower surface side of said drive base for moving said moving optical assembly;

a first printed wiring board mounted on the upper surface side of said drive base, said first printed wiring board having a signal demodulating circuit, a drive unit control circuit, and a drive circuit for driving said actuator means;

a first connector mounted on the lower surface side of said first printed wiring board;

a fixed optical assembly mounted on the lower surface side of said drive base, said fixed optical assembly including a head base, laser beam generating means mounted on said head base, a photodetector mounted on said head base, and a second printed wiring board mounted on said head base, said second printed wiring board having a laser drive circuit for driving said laser beam generating means and a preamplifier for amplifying an electrical signal obtained by photo-electric conversion from said photodetector wherein said second printed wiring board is a flexible printed wiring board and is folded at a folding portion so that a surface for mounting the laser drive circuit and the preamplifier is located at an inner side of the folded printed wiring board;

a second connector mounted on an upper surface of said second printed wiring board adjacent to said folding portion and connected to said first connector through said opening of said drive base; and an elastic member for supporting said second connector.

2. An optical disk drive unit according to claim 1, further comprising:

an optical disk cartridge loading assembly mounted on said drive base and disposed under said first printed wiring board, said optical disk cartridge loading assembly having a shutter opening/closing arm; and an insulating sheet interposed between said optical disk cartridge loading assembly and said first printed wiring board, said insulating sheet being provided with an outer peripheral sealing member.

3. An optical disk drive unit according to claim 2, further comprising a frame mounted on the lower surface side of said drive base.

4. An optical disk drive unit according to claim 3, further comprising a top cover and a bottom cover both fixed to said drive base.

5. An optical disk drive unit according to claim 3, further comprising a plurality of rubber vibration isolators, wherein said frame is mounted through said rubber vibration isolators to said lower surface side of said drive base.

6. An optical disk drive unit comprising:

a drive base having an opening and first and second opposing sides;

a spindle motor mounted on said drive base;

a moving optical assembly movably mounted on the second side of said drive base, said moving optical assembly having a beam rising mirror, an objective lens, and a lens actuator for performing focusing and tracking of a laser beam by moving said objective lens;

actuator means mounted on the second side of said drive base for moving said moving optical assembly;

a first printed wiring board mounted on the first side of said drive base, said first printed wiring board having a signal demodulating circuit, a drive unit control circuit, and a drive circuit for driving said actuator means;

a first connector mounted on said first printed wiring board so that said first connector faces the opening of said drive base;

a fixed optical assembly mounted on the second side of said drive base, said fixed optical assembly including a head base, laser beam generating means mounted on said head base, and a photodetector mounted on said head base;

a second printed wiring board provided between said head base and said drive base, said second printed wiring board being a flexible printed wiring board and being folded at a folding portion; and a second connector mounted on an upper surface of said second printed wiring board adjacent to said folding portion and connected to said first connector through said opening of said drive base.

7. An optical disk drive unit comprising:

a drive base having an opening and first and second opposing sides;

a spindle motor mounted on said drive base;

a moving optical assembly movably mounted on the second side of said drive base, said moving optical assembly having a beam rising mirror, an objective lens, and a lens actuator for performing focusing and tracking of a laser beam by moving said objective lens;

actuator means mounted on the second side of said drive base for moving said moving optical assembly;

a first printed wiring board mounted on the first side of said drive base, said first printed wiring board having a signal demodulating circuit, a drive unit control circuit, and a drive circuit for driving said actuator means;

a first connector mounted on said first printed wiring board so that said first connector faces the opening of said drive base;

a fixed optical assembly mounted on the second side of said drive base, said fixed optical assembly including a head base, laser beam generating means mounted on said head base, and a photodetector mounted on said head base;

a second printed wiring board provided between said head base and said drive base, said second printed wiring board being a flexible printed wiring board and being folded at a folding portion;

a second connector mounted on an upper surface of said second printed wiring board adjacent to said folding portion and connected to said first connector through said opening of said drive base; and an elastic member for supporting said second connector, said elastic member being provided adjacent to said folding portion of said second printed wiring board and sandwiched by said folded second printed wiring board.

8. An optical disk drive unit according to claim 7, wherein said second printed wiring board has mounted on folded inner sides, a laser drive circuit for driving said laser beam generating means and a preamplifier for amplifying an electrical signal obtained by photoelectric conversion from said photodetector.

* * * * *